United States Patent
Akkaya et al.

(10) Patent No.: US 11,329,806 B1
(45) Date of Patent: May 10, 2022

(54) SYSTEMS AND METHODS FOR AUTHENTICATION AND KEY AGREEMENT IN A SMART GRID

(71) Applicants: Kemal Akkaya, Miami, FL (US); Mumin Cebe, Miami, FL (US)

(72) Inventors: Kemal Akkaya, Miami, FL (US); Mumin Cebe, Miami, FL (US)

(73) Assignee: THE FLORIDA INTERNATIONAL UNIVERSITY BOARD OF TRUSTEES, Miami, FL (US)

(*) Notice: Subject to any disclaimer, the term of this patent is extended or adjusted under 35 U.S.C. 154(b) by 0 days.

(21) Appl. No.: 17/454,418

(22) Filed: Nov. 10, 2021

Related U.S. Application Data

(60) Provisional application No. 63/121,709, filed on Dec. 4, 2020.

(51) Int. Cl.
   *H04L 9/08* (2006.01)
(52) U.S. Cl.
   CPC .................................. *H04L 9/0844* (2013.01)
(58) Field of Classification Search
   USPC ........ 713/171, 150, 163, 181; 726/2, 21, 36; 380/255, 264, 276
   See application file for complete search history.

(56) References Cited

U.S. PATENT DOCUMENTS

| | | | | |
|---|---|---|---|---|
| 5,764,765 A * | 6/1998 | Phoenix | H04L 9/0858 380/256 |
| 6,748,083 B2 * | 6/2004 | Hughes | H04L 9/0858 380/278 |
| 7,437,081 B2 * | 10/2008 | Mitchell | H04B 10/70 398/154 |
| 8,855,316 B2 * | 10/2014 | Wiseman | H04L 9/0855 380/278 |
| 9,960,465 B2 * | 5/2018 | Dudley | H01M 10/6563 |
| 10,057,058 B2 * | 8/2018 | Murakami | H04L 9/0858 |
| 2005/0138352 A1 * | 6/2005 | Gauvreau | H04L 9/3247 713/153 |
| 2007/0065154 A1 * | 3/2007 | Luo | H04L 9/0852 398/141 |
| 2007/0076884 A1 * | 4/2007 | Wellbrock | H04L 9/0858 380/263 |
| 2007/0195774 A1 * | 8/2007 | Sherman | H04L 69/16 370/392 |
| 2011/0206204 A1 * | 8/2011 | Sychev | H04J 14/0273 380/256 |
| 2011/0213979 A1 * | 9/2011 | Wiseman | H04L 9/0844 713/171 |
| 2014/0010234 A1 * | 1/2014 | Patel | H04L 45/66 370/392 |
| 2014/0068765 A1 * | 3/2014 | Choi | H04L 63/1416 726/23 |

(Continued)

*Primary Examiner* — Sharif E Ullah
(74) *Attorney, Agent, or Firm* — Saliwanchik, Lloyd & Eisenschenk

(57) ABSTRACT

Systems and methods for authentication and key agreement are provided and can utilize a scheme that uses dynamic key generation to achieve replay-attack resistance in zero round trip time (0-RTT). The hash-chain concept can be integrated with the Diffie-Hellman (DH) key exchange scheme. With this scheme, a device can securely determine the new shared key immediately (i.e., in 0-RTT) and start using it.

18 Claims, 6 Drawing Sheets

(56) References Cited

U.S. PATENT DOCUMENTS

| | | | |
|---|---|---|---|
| 2014/0133652 A1* | 5/2014 | Oshida | H04L 9/0866 |
| | | | 380/255 |
| 2016/0241396 A1* | 8/2016 | Fu | H04L 9/0858 |
| 2016/0359626 A1* | 12/2016 | Fu | H04L 9/0858 |
| 2016/0366094 A1* | 12/2016 | Mason | G06F 3/067 |
| 2017/0214525 A1* | 7/2017 | Zhao | H04W 12/0431 |
| 2017/0230173 A1* | 8/2017 | Choi | H04L 9/12 |
| 2018/0176091 A1* | 6/2018 | Yoon | H04L 43/0888 |
| 2019/0036821 A1* | 1/2019 | Levy | G06F 12/0868 |
| 2019/0349392 A1* | 11/2019 | Wetterwald | H04L 43/0852 |
| 2020/0084222 A1* | 3/2020 | William | H04L 9/3297 |

* cited by examiner

SYSTEMS AND METHODS FOR AUTHENTICATION AND KEY AGREEMENT IN A SMART GRID

CROSS-REFERENCE TO RELATED APPLICATION

This application claims the benefit of U.S. Provisional Application Ser. No. 63/121,709, filed Dec. 4, 2020, which is hereby incorporated by reference herein in its entirety, including any figures, tables, and drawings.

GOVERNMENT SUPPORT

This invention was made with government support under DE-OE0000779 awarded by U.S. Department of Energy (DOE). The government has certain rights in the invention.

BACKGROUND

The existing power grid is currently going through a major transformation to enhance its reliability, resiliency, and efficiency by enabling networks of intelligent electronic devices (IED), sensors, remote terminal units (RTU), distributed energy resources (DER), and dispersed loads, which is collectively referred to as Smart(er) Grid. The ongoing power grid automation process benefits from the information provided by these devices, such as voltage, current, and temperature, for real-time monitoring of the grid. The information is conveyed to a supervisory control and data acquisition (SCADA) control center through the existing communication infrastructure of the grid that covers all the geographic areas where the IEDs/DERs and RTUs are deployed with low density. This is typically through a Wide-Area Network (WAN) technology such as general packet radio service (GPRS), 2/3G, and other proprietary radio communications.

There are two enablers in the transformation of the power grid: 1) addition of the new smart devices; and 2) enabling new communication channels such as wireless and fiber. While the addition of new smart devices to the grid is relatively easy due to their accessibility, upgrading the underlying communication infrastructure is much more difficult due to costs, scale, labor, and other involved third parties. Therefore, this will take more time and thus some of the existing legacy communication infrastructure technologies will still be around for a while. These legacy infrastructures in some cases may rely on some very low-bandwidth technologies such as 2G and other 900 megahertz (Mhz) radio technologies, which have bandwidths on the order of kilobits. Therefore, any new application that will be considered for the Smart Grid needs to take this restriction into account.

This is specifically the case for securing the power grid because it is a requirement to provide security while new devices are being added to the grid. As the communication between RTUs/IEDs and a control center (CC) needs to guarantee (at least) integrity and authentication, key management becomes a major challenge due to its overhead on narrow-band communication infrastructures that are part of the current power grid. Hence, using existing key management protocols that are designed for resource-rich communication networks is not feasible as they will congest the links, hindering the actual data transfer, and eventually causing longer delays that may not be acceptable for time-sensitive power flow control. In general, effective security mechanisms for the Smart Grid domain must guarantee the security of any applications running on it without compromising their performance.

Due to such communication infrastructure challenges to run security algorithms/protocols in general and key management schemes in particular, a naive solution the utilities follow is to use the same key for a long period of time. This is problematic as compromising one key means compromising forward secrecy (future data) during that period.

While there has been focus on designing computationally efficient security solutions in any resource-constrained domain, the extremely constrained infrastructure has never been considered because broad-band links are becoming part of the cyberspace, both wireless and wired. Nonetheless, recently Google introduced the QUIC protocol for efficiency in its client-server session key management. This protocol ensured zero round trip time (0-RTT), meaning that without a complete round trip message from a client to server, the encryption can start with the produced key. QUIC also triggered new developments in the standards, and Transport Layer Security (TLS) 1.3 came with similar features even eliminating the reliance on certificates (i.e., Public Key Infrastructure (PKI)). Despite their efficiency, these protocols have issues with certain attacks such as replay attacks that prevent them from being directly used in the Smart Grid domain. In particular, if O-RTT is desired, replay attack resistance is not currently possible.

BRIEF SUMMARY

Embodiments of the subject invention provide novel and advantageous systems and methods for authentication and key agreement, which can utilize a scheme that uses dynamic key generation to achieve replay-attack resistance in zero round trip time (0-RTT). The hash-chain concept can be integrated with the Diffie-Hellman (DH) key exchange scheme. With this scheme, a device can securely determine the new shared key immediately (i.e., in O-RTT) and start using it. The scheme can include three phases to achieve secure communication between field devices and a control center (CC): i) setup and configuration; ii) key agreement; and iii) key refreshment. In the first phase, when a field device joins the power grid, it completes registration with the CC. After a successful setup, the CC creates an authentication key for the field device. Then, they use this key to establish mutual authentication.

In an embodiment, a system for authentication and key agreement in a smart grid can comprise: a control center; and a plurality of field devices, each field device of the plurality of field devices being configured such that, when it first joins the smart grid, it performs a setup by sending to the control center a DH request message that includes the identification of the field device sending the DH request message, and the control center being configured such that, upon receiving the DH request message, the control center generates a secret key, $S_i=H(ID_i||Nonce)$, for the field device that sent the DH request message, computes $H''(S_i)=S''$ where n is a predefined parameter and $H''(S_i)$ is obtained by taking a cryptographic hash of $S_i$: $H(H(H, \ldots, H(S_i))$, and sends a DH configuration to the field device that sent the DH request message, the DH configuration comprising a shared DH component, an update time, and the current secret key, and i representing the field device that sent the DH request message. Each field device of the plurality of field devices can be further configured such that when it sends data to the control center after performing the setup, the field device first computes a shared key and uses the shared key to encrypt and authenticate the data to be sent to the control center, and sends the current secret key to the control center along with the encrypted data. The control center can be further configured such that, upon receiving a current secret key and data from a field device of the plurality of field devices, the control center ensures the validity of the field device by checking whether the current secret key is correct, and then sends an updated secret key to the field device, which is configured to compute the hash of the updated secret key and check whether it is equal to the current secret key to ensure the validity of the control center and to update the current secret key to the updated secret key if the control center is determined to be valid. Each field device of the plurality of field devices can be further configured to refresh the shared key by using a first random number, computing a fresh ephemeral DH share, and generating a refreshed secret key. The control center can be further configured to refresh the shared key by using a second random number and computing the refreshed secret key based on the second random number and the fresh ephemeral DH share. The shared DH component can be computed based on $g^c$, where g is a DH parameter and c is the second random number picked by the control center. The fresh ephemeral DH share being computed based on $g^b$, where b is the first random number. The current secret key can be utilized for a period of time no longer than the update time. Each field device of the plurality of field devices can be, for example, an intelligent electronic device (IED), a sensor, a remote terminal unit (RTU), a distributed energy resource (DER), or a dispersed load. The control center and the plurality of field devices can communicate with each other wirelessly (e.g., utilizing bandwidth on the order of kilobits and/or via at least one of a radio tower and the internet). The control center can generate a different secret key for each field device of the plurality of field devices. The control center can be a supervisory control and data acquisition (SCADA) control center.

In another embodiment, a method for authentication and key agreement in a smart grid that comprises a control center and a plurality of field devices can comprise: performing, by each field device of the plurality of field devices when it first joins the smart grid, a setup by sending to the control center a DH request message that includes the identification of the field device sending the DH request message; generating, by the control center upon receiving the DH request message, a secret key, $S_i$=H(ID$_i$||Nonce), for the field device that sent the DH request message, followed by computing H''($S_i$)=S'' where n is a predefined parameter and H''($S_i$) is obtained by taking a cryptographic hash of $S_i$: H(H(H, . . . , H($S_i$)), and sending a DH configuration to the field device that sent the DH request message, the DH configuration comprising a shared DH component, an update time, and the current secret key, and i representing the field device that sent the DH request message; computing, by each field device of the plurality of field devices when sending data to the control center after performing the setup, a shared key, followed by using the shared key to encrypt and authenticate the data to be sent to the control center, and sending the current secret key to the control center along with the encrypted data; ensuring, by the control center upon receiving a current secret key and data from a field device of the plurality of field devices, the validity of the field device by checking whether the current secret key is correct, and then sending an updated secret key to the field device; computing, by each field device of the plurality of field devices when receiving an updated secret key from the control center, the hash of the updated secret key and checking whether it is equal to the current secret key to ensure the validity of the control center and to update the current secret key to the updated secret key if the control center is determined to be valid; refreshing, by each field device of the plurality of field devices, the shared key by using a first random number, computing a fresh ephemeral DH share, and generating a refreshed secret key; and refreshing, by the control center, the shared key by using a second random number and computing the refreshed secret key based on the second random number and the fresh ephemeral DH share. The shared DH component can be computed based on $g^c$. The fresh ephemeral DH share being computed based on $g^b$. The current secret key can be utilized for a period of time no longer than the update time. Each field device of the plurality of field devices can be, for example, an IED, a sensor, a RTU, a DER, or a dispersed load. The control center and the plurality of field devices can communicate with each other wirelessly (e.g., utilizing bandwidth on the order of kilobits and/or via at least one of a radio tower and the internet). The control center can generate a different secret key for each field device of the plurality of field devices. The control center can be a SCADA control center.

DETAILED DESCRIPTION

Figure 1:
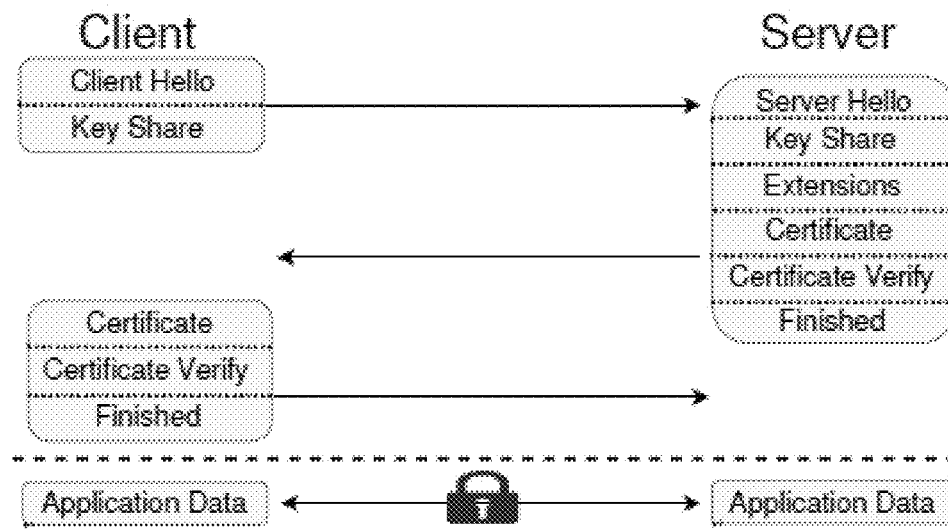
FIG. 1 shows a schematic view of Transport Layer Security (TLS) 1.3 key exchange.

Embodiments of the subject invention provide novel and advantageous systems and methods for authentication and key agreement, which can utilize a scheme that uses dynamic key generation to achieve replay-attack resistance in zero round trip time (0-RTT). The hash-chain concept can be integrated with the Diffie-Hellman (DH) key exchange scheme. With this scheme, a device can securely determine the new shared key immediately (i.e., in 0-RTT) and start using it. The scheme can include three phases to achieve secure communication between field devices and a control center (CC): i) setup and configuration; ii) key agreement; and iii) key refreshment. In the first phase, when a field device joins the power grid, it completes registration with the CC. After a successful setup, the CC creates an authentication key for the field device. Then, they use this key to establish mutual authentication.

With the increasing digitization of different components of Smart Grid, there is an ongoing need for secure protocols that are deployable for different applications. A major need problem to deal with is key management for a large number of devices that are resource constrained and deployed within a legacy communication environment. Assuming a legacy radio communication infrastructure with bandwidths on the order of kilobits, embodiments of the subject invention enable essential security services in the Smart Grid via a lightweight key management scheme. The scheme can provide mutual authentication, key agreement, and key refreshment by utilizing a 0-RTT message exchange that relies neither on certificates nor session resumption. Instead, it can depend on a dynamic hash chains concept to enable authentication and prevent or inhibit any replay attacks between field devices and a CC. Evaluation results show that the scheme significantly outperforms conventional approaches and is suitable for Smart Grid legacy infrastructure (see the example).

Because reducing the latency of the key exchange is a particular interest in utility industries, embodiments of the subject invention address the problems discussed in the Background section by providing a secure and communication efficient key exchange protocol that can be used for legacy power grid applications. An authentication and key agreement scheme can utilize dynamic key-generation schemes (see, e.g., Ngo et al., Dynamic key cryptography and applications, IJ Network Security 10 (2010), which is hereby incorporated by reference herein in its entirety) to achieve replay-attack resistance in zero round trip time (0-RTT). Dynamic key generation is an authentication system based on hash chains that is specifically used for dumb terminals where one does not want to use a long-term key in the authentication. This hash-chain concept can be integrated with the widely used Diffie-Hellman (DH) Key Exchange scheme (see Diffie and Hellman, New directions in cryptography, Transactions on Information Theory (1976), which is hereby incorporated by reference herein in its entirety). The systems and methods of embodiments of the subject invention allow intelligent electronic devices (IEDs) and/or remote terminal units (RTUs) to achieve lightweight mutual authentication and key exchange, which means that a field device can securely determine the new shared key immediately (i.e., in 0-RTT). Because the keys are renewed at each data collection round, embodiments provide forward secrecy to guarantee the security of power grid state estimation. Also, through the use of the hash chain's elements for unique state representation at each device, embodiments are also resistant to replay attacks, which is not available in the related art.

To assess the delay overhead of the embodiments, a realistic simulation infrastructure was built for collection of data from field devices using the long range (LoRa) communication standard that is available for wireless wide area communications (Adelantado et al., Understanding the limits of lorawan, IEEE Communications magazine 55(9), 34-40 (2017); which is hereby incorporated by reference herein in its entirety). An ns-3 simulator was used to model LoRa characteristics as a low-bandwidth communication infrastructure (i.e., in the order of kilobits (kbits)). The results indicated that compared to existing conventional schemes, the embodiments of the subject invention provide significantly lower communication overhead while achieving secure and efficient key exchange.

In recent years, reducing the latency of the key exchange is a particular interest in the industry. As a result, the QUIC protocol allows the parties to accomplish key-exchange in 0-RTT. Facebook also has come up with a 0-RTT protocol that is very similar to QUIC, except that it uses another nonce and additional encryption for the ServerHello message. Inspired from QUIC, TLS standard was recently updated to TLS 1.3, which enables 0-RTT. TLS also enabled authentication without relying on PKI, which was used in QUIC. However, TLS 1.3 0-RTT is based on the key resumption idea, meaning that it relies on the session key created for the previous session to encrypt the first flight of data before creating a new key.

With current 0-RTT schemes, data can be captured and replayed by adversaries. Neither QUIC nor TLS 1.3 0-RTT has any replay attack protection. Due to this issue, QUIC is only used for hypertext transfer protocol (http) GET requests in Google to eliminate any security impact with PUT or DELETE operations. Similarly, TLS 1.3 standard has warnings about 0-RTT usage (Rescorla et al., The transport layer security (tls) protocol version 1.3 (2018); which is hereby incorporated by reference herein in its entirety). Basically, the standard mentions that for a specific client 0-RTT should be applied only once to prevent a replay attack. The consequent key generation should be based on at least 1 round trip time (1-RTT). Further, the TLS 1.3 standard also urges avoiding 0-RTT use for non-idempotent operations. Specifically, it suggests sending only initial data that does not update any state in the server side. Unfortunately, both of these policies/suggestions to prevent a replay attack are not applicable in the power grid domain. First, the IEDs/RTUs regularly transfer data to a control center (CC). Thus, if a client device is limited to only one 0-RTT, then in the next data collection round 0-RTT could not be used and thus the key exchange will incur additional delays. Second, the data sent by client devices to a CC is typically used for state estimation, which is very crucial in taking control actions. Because this data updates the state in the server, it is a non-independent operation that must be secure against any replay or injection attacks. Therefore, TLS 1.3 0-RTT or QUIC cannot be used in power grid applications. Embodiments of the subject invention address this gap by providing a replay-attack resistant 0-RTT key exchange.

As 0-RTT key exchange mechanisms evolve in industry as a result of the low-latency demands, the work in Fischlin et al. (Multi-stage key exchange and the case of google's quic protocol, In: Proceedings of the 2014 ACM SIGSAC Conference on Computer and Communications Security (2014); which is hereby incorporated by reference herein in its entirety) and Hale et al. (Simple security definitions for and constructions of 0-rtt key exchange, In: International Conference on Applied Cryptography and Network Security (2017); which is hereby incorporated by reference herein in its entirety) provided a general definition of key exchange protocols to analyze the properties of QUIC. Lychev et al. (How secure and quick is quic? provable security and performance analyses, In: Symposium on Security and Privacy, IEEE (2015); which is hereby incorporated by reference herein in its entirety) analyzed the efficiency of these protocols in addition to their security. Gunther et al. (0-rtt key exchange with full forward secrecy, In: Annual International Conference on the Theory and Applications of Cryptographic Techniques (2017); which is hereby incorporated by reference herein in its entirety) and Derler et al. (Bloom filter encryption and applications to efficient forward-secret 0-rtt key exchange, In: Annual International Conference on the Theory and Applications of Cryptographic Techniques, pp. 425-455, Springer (2018); which is hereby incorporated by reference herein in its entirety) also offer a 0-RTT key exchange scheme. However, these studies do not follow the well-studied crypto frames such as Rivest-Shamir Adleman (RSA) or Elliptic Curve to produce the key share. Gunther et al. is based on puncturable encryption (PE) while Derler et al. is based on bloom Filter Encryption. Both have very large key sizes, which are up to 400 megabytes (MB) and are therefore not efficient enough to be deployed in practice let alone for a power grid domain.

The first generation of well-known key exchange mechanisms did not consider much about the efficiency or overhead because secure connections were considered to be the exception rather than the norm. For instance, the older IPSec internet key exchange version 1 (IKEv1) needs up to 4.5 round trip time (RTT) whereas the improved version of it (IKEv2) requires 2 RTT.

Internet Engineering Task Force (IETF) approved TLS 1.3 published as RFC 8446 in August 2018. The new standard decreases the initial key establishment between a client and a server even further to 1-RTT. This newly introduced key exchange mechanism is one of the most significant changes in TLS 1.3. The message flows in FIG. 1 represent a mutual authentication handshake in public key infrastructure (PKI) settings. A client first sends Client Hello, which includes the cryptographic parameters and nonce. In addition, because TLS 1.3 utilizes a DH Key exchange concept, it sends a freshly generated DH Key Share. The server responds with a Server Hello message, which includes its choice of cryptographic parameters and a server nonce. The server also sends its own freshly generated DH key share Key Share and related Extensions. The server includes its Certificate and a signature on all messages CertificateVerify for authentication purposes. The server's finished message is a Message Authentication Code (MAC) over the entire handshake to provide the integrity using the created shared key. Finally, the client sends its own Certificate and a signature, CertificateVerify, for client authentication. As in the server's case, the finished message is a MAC over the entire handshake. This message provides both the integrity and key confirmation. TLS also provides a mechanism to accomplish 1-RTT key-exchange mechanism using pre-shared keys (PSK) instead of PKI.

Figure 2:
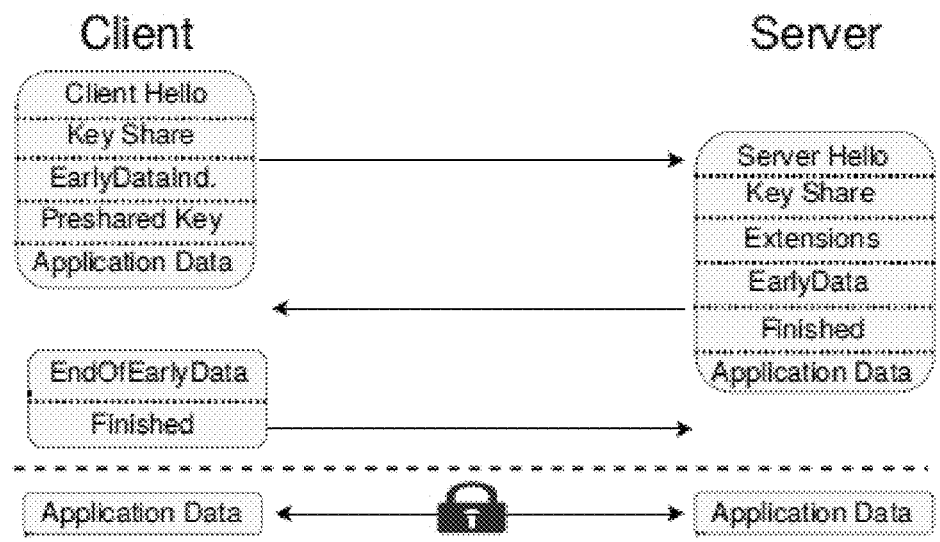
FIG. 2 shows a schematic view of TLS 1.3 key 0-round trip time (0-RTT) pre-shared key (PSK) resumption.

Embodiments of the subject invention provide a further optimization to 1-RTT key-exchange scheme by using 0-RTT key-exchange. In a 0-RTT key exchange mechanism, clients can send encrypted data in their first message to the server, eliminating any additional latency due to performing the key-exchange. TLS 1.3 describes what it refers to as a 0-RTT mechanism, which is based on a pre-shared key (PSK) that is either obtained externally or via a previous handshake. FIG. 2 shows the 0-RTT mechanism described in TLS 1.3. Clients send encrypted data in their first message to the server as "early data" by encrypting it via the PSK. Although the scheme is called 0-RTT, it is not truly 0-RTT and is actually a form of PSK resumption protocol. The main idea is that after a session is established, the client and server can derive a fresh secret by using the previous master secret. However, the first flight of data is still encrypted by the PSK rather than the newly computed fresh shared key. Compared to the 1-RTT handshake pattern, the first application data does not have forward secrecy if the server's long-term secret key is compromised. In addition, the first message from the client is also subject to a replay attack where adversaries are able to update the server state by replaying the message. However, TLS 1.3 standard document concluded that this downside is of negligible importance compared to the benefits of the handshake pattern when it is used under only certain conditions.

Figure 3:
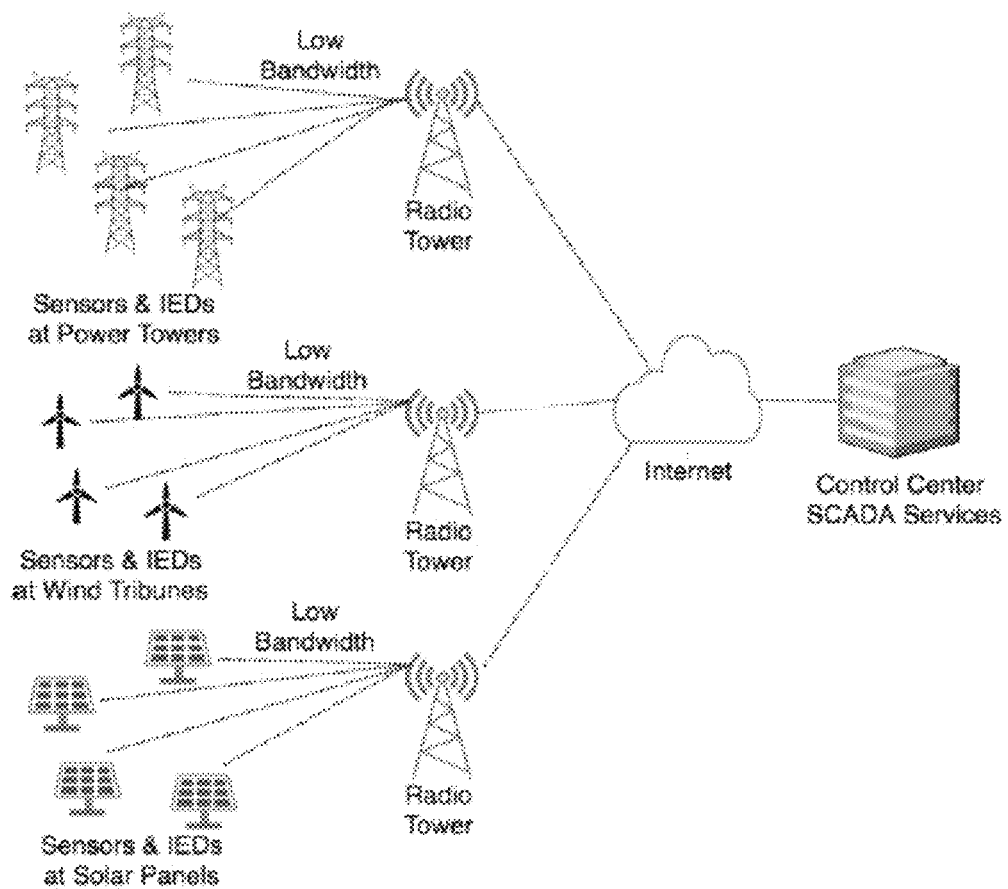
FIG. 3 shows an overview of a sample legacy infrastructure.

A power grid SCADA control application where data from field devices such as IEDs, RTUs, or distributed energy resources (DERs) are collected via a wide-area communication network and processed to make decisions is shown in FIG. 3. The communication network is wireless and has a number of base stations spanned through the geographical area served by the utility. The IEDs/RTU/DERs are considered client field devices, which communicate with these base stations that eventually relay their data to the SCADA control center using some sort of back-haul wireless or wired links. The wireless communication between base stations and field devices is severely limited in terms of bandwidth. It can be on the order of kilobits, which is in line with the technology used in 2G or other proprietary protocols.

A threat model can assume the following attacks are possible when keys are created and distributed to field devices:
  Impersonation and Man in the Middle (MitM) Attack: The communication between two parties with the presence of a passive or active eavesdropper as the adversary can be considered. It can be assumed that the adversary can impersonate one of the legitimate field devices or the CC. In addition, it can be assumed that an adversary in the middle decouples the end-to-end communication between the field device and CC by establishing independent connections with them. The attacker relays messages between them as if they are communicating directly with each other.
  Ephemeral Shared Key Compromise: It can be assumed that either the DH Share or the shared key can be compromised by an adversary.
  Replay attack: It can be assumed that an adversary can obtain valid key exchange messages from the traffic and store it. Then, it uses this message to fool either the CC or the field device into thinking that they have completed the key agreement.

In an embodiment, a protection scheme can have three phases to achieve secure communication between field devices and a CC: i) setup and configuration; ii) key agreement; and iii) key refreshment. In the first phase, when a field device joins the power grid, it completes registration with the CC. After a successful setup, the CC creates an authentication key for the field device. Then, they use this key to establish mutual authentication.

Setup and Configuration Phase

When a new field device joins to the power grid, it sends a DH REQUEST message to the CC that also contains the identification (ID) of the device. Upon receiving the DH REQUEST, the CC generates a secret key, $S_i=H(ID_i||Nonce)$ for that device. This step helps the CC to identify the field device with the parameters $ID_i$ and Nonce where HO is a one-way secure hash function.

Afterwards, the CC computes $H^n(S_i)=S^n$ where n is a predefined parameter and $H^n(S_i)$ is obtained by taking n cryptographic hash of $S_i$: $H(H(H, \ldots, H(S_i))$. It is noted that a key part of this scheme depends on this repetitive hashing, which creates a hash chain of n different one-time keys.

Figure 4:
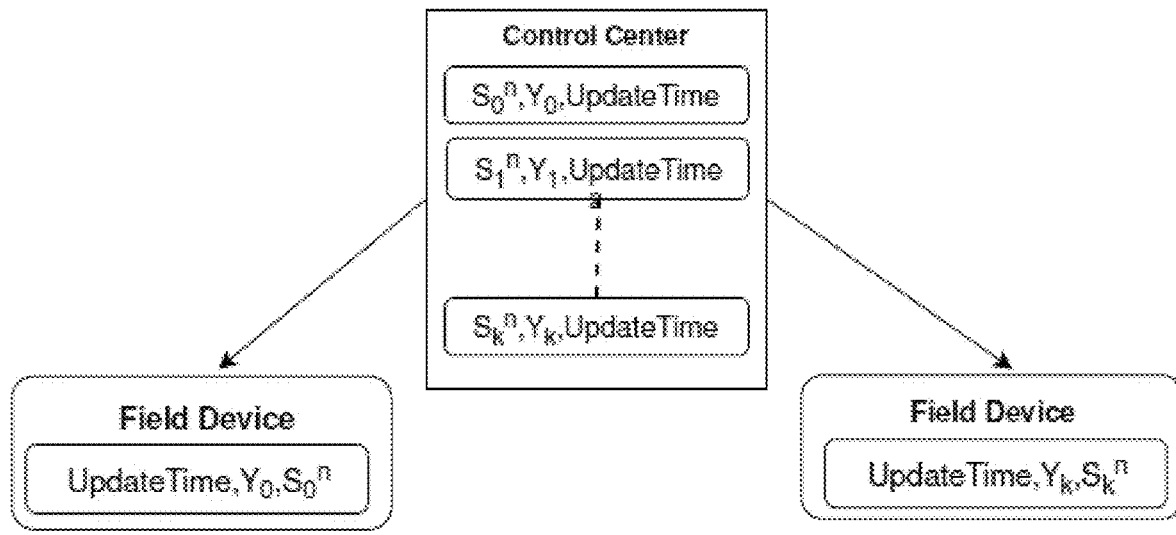
FIG. 4 shows a schematic view of a distribution of one-time authentication keys.

In the scheme, the field devices will only store $H^n(S_i)$ while the CC will store $H^{n-1}(S_i)$ and $H^n(S_i)$ at a given data collection period t. These keys are stored along with a deadline (e.g., UpdateTime as shown in FIG. 4) that is used for updating the DH component value. The deadlines can be set irregularly up to several days. After this first setup, there will be no need for reconfiguration until n is exhausted or until the deadlines are reached. The size of n can be adjusted to be sufficient enough for the DH period. When the deadline is reached, a new DH value must be assigned again for forward secrecy. After the creation of keys $H^n(S_i)$ for the field device, the CC sends to a device i the DH configuration that contains $<Y_i, \text{Update Time}, S_i^n)>$, where Yi is the shared DH component with the field device and UpdateTime is the expiration time of DH component. Yi is computed by $g^c$ where g is the DH parameter and c is the random number picked by the CC. FIG. 4 shows this process. $Y_i$ will be used by the field device to derive an ephemeral shared key over 0-RTT as will be explained next. The DH component will be updated when UpdateTime comes, but this can be set in advance.

This phase of the scheme is done securely right after the 1-RTT setup phase of TLS 1.3 (see FIG. 1 until the dashed lines). However, this is a one-time process and once it is completed, it will not be repeated until n or UpdateTime for DH values is reached.

0-RTT Key Agreement Phase

When a field device would like to send data to the CC for the first time after the setup and configuration phase, it firsts needs to compute a shared key. To this end, it picks up a random a and generates a shared secret key $k_1=Y_0^a$. Using this shared key $k_1$, the field device can encrypt and authenticate data to be sent to the CC. It also computes a fresh ephemeral DH share $X_1=g^a$ where g is either a prime number if RSA is used or elliptic curve parameter base if Elliptic Curve Cryptography (ECC) is used. The data, $X_1$ and the stored $S_i^n$ are sent to the CC. At the CC, the same shared key is computed from V. Note that $k_1$ would be equal to $X_1^c$ which means $k_1=g^{ac}$. The CC now ensures the freshness of the field device by checking whether the sent $S_i^n$ is equal to the stored one. This also ensures the authentication of the field device. Then the CC sends a fresh $S_i^{n-1}$ to the field device.

Figure 5:
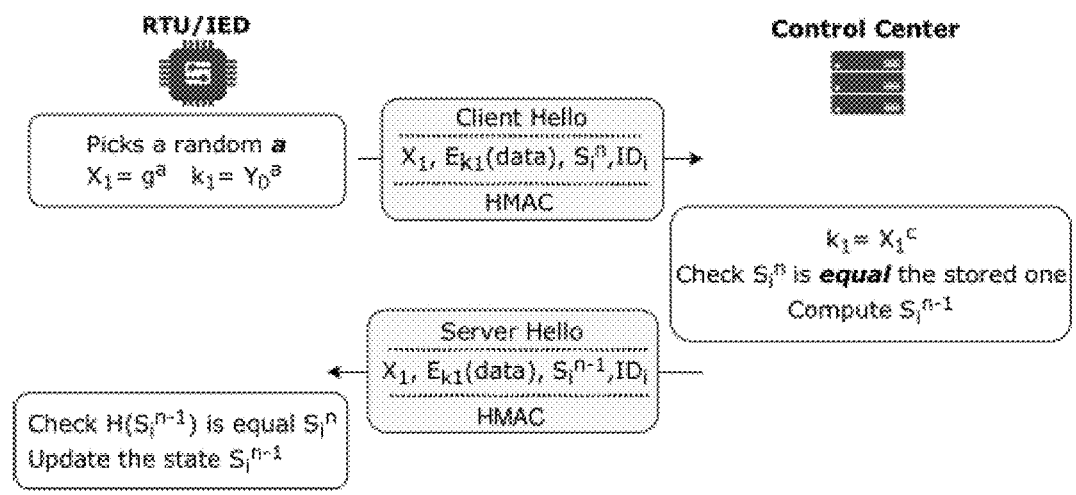
FIG. 5 shows a schematic view of 0-RTT key agreement, according to an embodiment of the subject invention.

The field device computes the hash of $H(S_i^{n-1})$ and checks whether it is equal to the previous $S_i^n$ to ensure the CC's freshness. If the result is equal to the previous $S_i^n$, authentication of the CC is done and the field device updates the old value with the new $S_i^{n-1}$. This means it implicitly agrees on the key $k_1$, which is then used for all subsequent data exchanges within the same session. The entire process is shown in FIG. 5.

0-RTT Key Refreshing

Although the shared key in a previous connection can be used for "session resumption" in further connections by tying the new connection cryptographically to the previous connection without needing a handshake, DH key exchange can be used in order to provide forward secrecy for the application data in combination with the hash chain that act as authenticators. This is one of the novel and advantageous aspects of embodiments of the subject invention.

The key refreshing works as follows: as in the previous case, the field device picks up another random number, (e.g., b) and computes a fresh ephemeral DH share $X_2=g^b$. Then, it generates another temporal shared secret key $k_2$ from $Y^b$. This temporal shared key $k_2$ is again used for both encryption and authentication. This time field device sends the stored $S_i^{n-1}$ for freshness to the CC.

Figure 6:
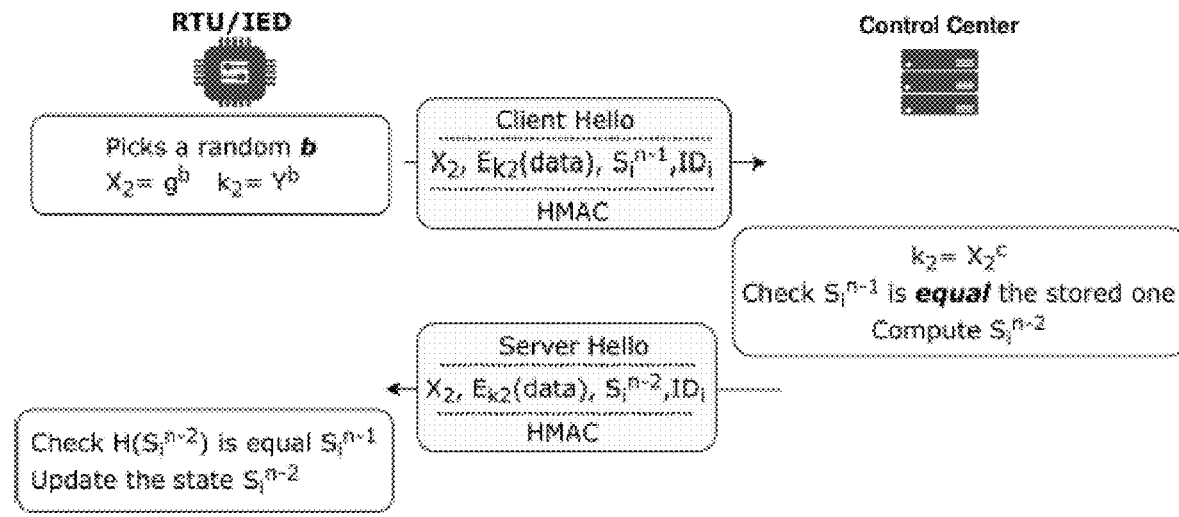
FIG. 6 shows a schematic view of 0-RTT key refresh, according to an embodiment of the subject invention.

At the CC, the same shared key $k_2$ is computed from $X_2^C$. The rest of the protocol uses the same computations and messages as for the previous handshake by computing $S_i^{n-2}$. The process is shown in FIG. 6. This phase can be repeated until reconfiguration time when either n is exhausted or DH share expires.

With respect to a MitM attack, embodiments of the subject invention mitigate such an attack by providing mutual authentication between the field device and the CC. The mutual authentication is achieved through the computed $S_i$ values, which uniquely identifies a client by hashing the ID of it with a nonce $H(ID_i, Nonce)$. In addition, the chain of the hash also provides an implicit authentication for the CC itself because the field device can authenticate the CC by computing the $H(S_i^{n-1})$. For any message altering between the field device and CC, the hash-based message authentication code (HMAC) mechanism provides tamper detection. The adversary cannot calculate a legitimate HMAC without forging the shared key.

With respect to forward secrecy, in the case of an attack where ephemeral DH share Y is stolen, the attacker will be able to derive $k_1$. However, because Y needs to be updated in a medium-term, this will enable computing new session keys from the new DH share and thus providing forward secrecy. Schemes of embodiments of the subject invention allow power grid operators to arrange the level of forward secrecy by managing the DH update time policy. In case of the compromise of a shared key $k_1$, the key refresh phase requires picking up a new random number b to obtain another shared key, $k_2$, and thus the adversary will not be able to obtain $k_2$. This ensures perfect forward secrecy.

Different solutions can be used to address replay attacks, but doing so is more challenging in a severely restricted environment. For instance, in TLS 1.3 1-RTT, replay attacks are addressed through nonce values. Each side generates a unique nonce value that is employed to guarantee that the other party is fresh by forcing them to include the nonce in the key derivation. However, when a scheme is restricted to use 0-RTT, only one side will be able to add a nonce, not both. Another option might be applying timestamps in preventing a replay attack. When a field device wants to send a message to the CC, it includes its measure of the time in the message. Thus, the CC only accepts messages for which the timestamp is within a reasonable time threshold. Although the timestamping solution works with accurate synchronization and a reliable communication environment where the packet latency is negligible, it might cause problems when the communication medium is unreliable and has high data latency, which may the case for some applications of embodiments of the subject invention. Also, even though secure time synchronization is achieved, an adversary can still accomplish replay attacks, if the adversary performs it fast enough within the needed time-limit.

Embodiments can address replay attack mitigation based on state changes for the CC or field devices. Whenever a new key is created, the device or CC can move to a new state. Therefore, if there is a replay message, it will be ignored as the state of the device or CC is changed. These states can be created based on $S_i^n$ values. Specifically, in the protocol, the field device can send $S_i^n$ to the CC, and this is considered as the state of the CC. The CC first confirms that the received state information matches with its own state (i.e., $S_i^n$) and then computes Sf to update its state. This process ensures the freshness of the message coming from the field device when encrypting the first data message. Thus, even if an adversary performs a replay of this first message, the CC will not validate $S_i^n$ as it already moved to a new state (i.e., $S_i^{n-1}$). After the CC receives the first message from the field device, it sends $S_i^{n-1}$ to it. The field device validates $H(S_i^{n-1})$ and updates its own local state to $S_i^{n-1}$. Thus, a replay message to the field device for this message would not be accepted as its state has changed. Therefore, the protocol is resistant to replay attacks while still performing a 0-RTT key exchange.

Embodiments of the subject invention reduce the overhead of key-exchange mechanisms in the low-bandwidth communication environments for Smart Grids. A replay-attack resistant 0-RTT key-exchange mechanism can be used (e.g., along with a payload transfer). The example below shows the superior performance of the approach compared to standard key-exchange mechanisms. This addresses the problem of how low-bandwidth links would otherwise significantly hinder the applicability of security protocols for smart grid applications.

Embodiments of the subject invention reduce the number of messages to be exchanged to agree on a shared key to 0. In this way, the channels are not kept busy with key related messages and thus available bandwidth is increased. This is advantageous for all bandwidth environments but especially crucial for extremely low bandwidth environments. Embodiments also provide quick creation of a symmetric shared key, which reduces any communication delays. Embodiments are also secure against any type of replay attack.

The methods and processes described herein can be embodied as code and/or data. The software code and data described herein can be stored on one or more machine-readable media (e.g., computer-readable media), which may include any device or medium that can store code and/or data for use by a computer system. When a computer system and/or processor reads and executes the code and/or data stored on a computer-readable medium, the computer system and/or processor performs the methods and processes embodied as data structures and code stored within the computer-readable storage medium.

It should be appreciated by those skilled in the art that computer-readable media include removable and non-removable structures/devices that can be used for storage of information, such as computer-readable instructions, data structures, program modules, and other data used by a computing system/environment. A computer-readable medium includes, but is not limited to, volatile memory such as random access memories (RAM, DRAM, SRAM); and non-volatile memory such as flash memory, various read-only-memories (ROM, PROM, EPROM, EEPROM), magnetic and ferromagnetic/ferroelectric memories (MRAM, FeRAM), and magnetic and optical storage devices (hard drives, magnetic tape, CDs, DVDs); network devices; or other media now known or later developed that are capable of storing computer-readable information/data. Computer-readable media should not be construed or interpreted to include any propagating signals. A computer-readable medium of the subject invention can be, for example, a compact disc (CD), digital video disc (DVD), flash memory device, volatile memory, or a hard disk drive (HDD), such as an external HDD or the HDD of a computing device, though embodiments are not limited thereto. A computing device can be, for example, a laptop computer, desktop computer, server, cell phone, or tablet, though embodiments are not limited thereto.

Embodiments of the subject invention can be incorporated as code; for example, a system can include a processor and a (non-transitory) machine-readable medium (e.g., a (non-transitory) computer-readable medium) in operable communication with the processor and having instructions stored thereon that, when executed by the processor, perform the steps of the scheme that uses dynamic key generation to achieve replay-attack resistance in 0-RTT (as described herein). The processor and/or medium can be in operable communication with the field device(s) and/or CC.

A greater understanding of the embodiments of the subject invention and of their many advantages may be had from the following examples, given by way of illustration. The following examples are illustrative of some of the methods, applications, embodiments, and variants of the present invention. They are, of course, not to be considered as limiting the invention. Numerous changes and modifications can be made with respect to the invention.

Example 1

To assess the performance of the proposed key-exchange mechanism, a severely bandwidth-constrained environment in an ns-3 network simulator was created by utilizing LoRa, which is a standard to transmit data at long distances (e.g., 1 kilometer (km) in an urban setting and 10 km in a rural setting) by adjusting its transmission bit-rate (see also Adelantado et al., Understanding the limits of lorawan, IEEE Communications magazine 55(9), 34-40 (2017); which is hereby incorporated by reference herein in its entirety). The available bandwidth can be on the order of bits depending on the distance, which mimics the available resources currently in use by some utilities.

To obtain a realistic comparison of the approach with conventional key exchange mechanisms, the network, field devices, and CC were virtualized using Linux containers, and they were integrated with ns-3 through an ns-3 tap bridge mechanism (see also Rosen, Linux containers and the future cloud, Linux J (2014); which is hereby incorporated by reference herein in its entirety). A data submission application was implemented from the field device to the CC. Wolfssl (WolfSSL-Embedded, Library for applications, devices, iot, and the cloud, which is hereby incorporated by reference herein in its entirety) and strongswan (Steffen, Strongswan-the opensource ipsec-based vpn solution (2014), which is hereby incorporated by reference herein in its entirety) libraries were installed to realize the standard implementation of internet protocol security (IPSec) and TLS. For reduced complexity, Elliptic-curve Diffie-Hellman with curve definition secp256r1 and 128 bits AES-GCM block cipher were used (Brown, Sec 1: Elliptic curve cryptography. Tech. rep. (2009); and Salowey et al., Aes galois counter mode (gcm) cipher suites for tls, Tech. rep. (2008), both of which are incorporated by reference herein in their entireties).

Two settings were created where there is a single gateway surrounded by 200 uniformly distributed devices. The first setting mimicked an urban environment where devices are within 1 km distance of the gateway. The second setting mimicked a rural environment, with this distance being up to 10 km. It was assumed that each device generated regular data traffic at the rates of 10 bits per second (bps), 20 bps, 40 bps, and 80 bps.

When a new key is to be created between the CC and the field device, the data to be sent needs to wait until the key is created because this is similar to establishing a session in transmission control protocol (TCP). Therefore, in the tests, the average elapsed time for the first encrypted payload data to reach the CC from a device is reported in order to assess the impact of key exchange on data transfer delay. The application running on both the CC and field devices used both conventional key-exchange mechanisms (i.e., IPSec IKEv1, IPSec IKEv2, TLS1.2, and TLS1.3) and a system/method according to embodiments of the subject invention to send the data to the CC securely. Two cases were considered for mutual device authentication, in each of the urban setting and the rural setting: 1) a PKI setting where certificates were used for signature and authentication; and 2) a PSK Setting where no certificates were used and instead, a previously used shared key was used for authentication purposes.

Figure 7:
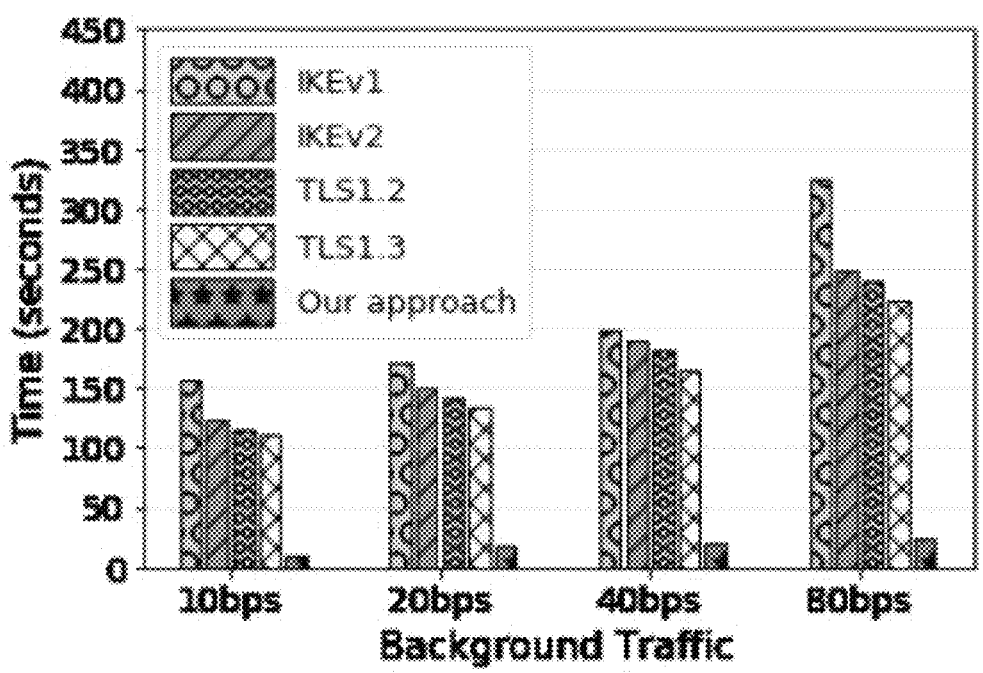
FIG. 7 shows a bar chart of urban public key infrastructure (PKI) settings. The vertical axis is time (in seconds (s)), and the horizontal axis shows background traffic of 10 bits per second (bps), 20 bps, 40 bps, and 80 bps. In each grouping of bars, the leftmost bar is for internet key exchange version 1 (IKEv1), the second-to-the-leftmost bar is for internet key exchange version 2 (IKEv2), the middle bar is for TLS 1.2, the second-to-the-rightmost bar is for TLS 1.3, and the rightmost bar is for a system/method according to an embodiment of the subject invention (labeled "our approach" in FIG. 7).
Figure 8:
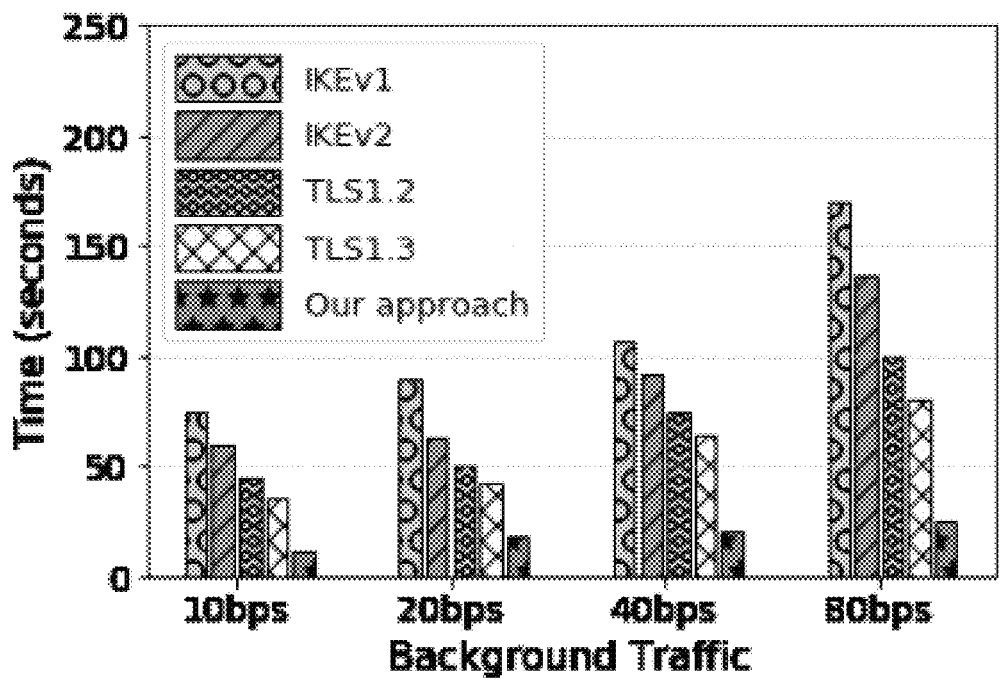
FIG. 8 shows a bar chart of urban PSK settings. The vertical axis is time (in s), and the horizontal axis shows background traffic of 10 bps, 20 bps, 40 bps, and 80 bps. In each grouping of bars, the leftmost bar is for IKEv1, the second-to-the-leftmost bar is for IKEv2, the middle bar is for TLS 1.2, the second-to-the-rightmost bar is for TLS 1.3, and the rightmost bar is for a system/method according to an embodiment of the subject invention (labeled "our approach" in FIG. 8).

FIG. 7 shows the results for urban PKI settings. Referring to FIG. 7, the results indicate that the key-exchange is a costly operation especially under low bandwidth. The elapsed time required to transmit the first encrypted data increases as background traffic grows. For instance, the data submission by utilizing IKEv1 takes up to 6 minutes, which significantly hinders actual data transmission and thus may put the Smart Grid operations at risk. PSK on the other hand does not carry the overhead of certificate and signature exchange to establish secure communication. As such, the results for urban PSK are much better than those for urban PKI results, as seen in FIG. 8. For example, the data submission by IKEv1 takes around 3 minutes in urban PSK instead of 6 minutes as with urban PKI.

For both urban PKI and urban PSK, the system/method of embodiments of the subject invention significantly reduced the data submission time compared to the other standards due to the decreased number of messages during the handshake. Even with respect to TLS 1.3, which is touted as one of the most efficient methods for the secure transport layer, the system/method of embodiments of the subject invention reduced the data submission latency approximately 20 orders of magnitude for PKI and 5 orders of magnitude for PSK.

Figure 9:
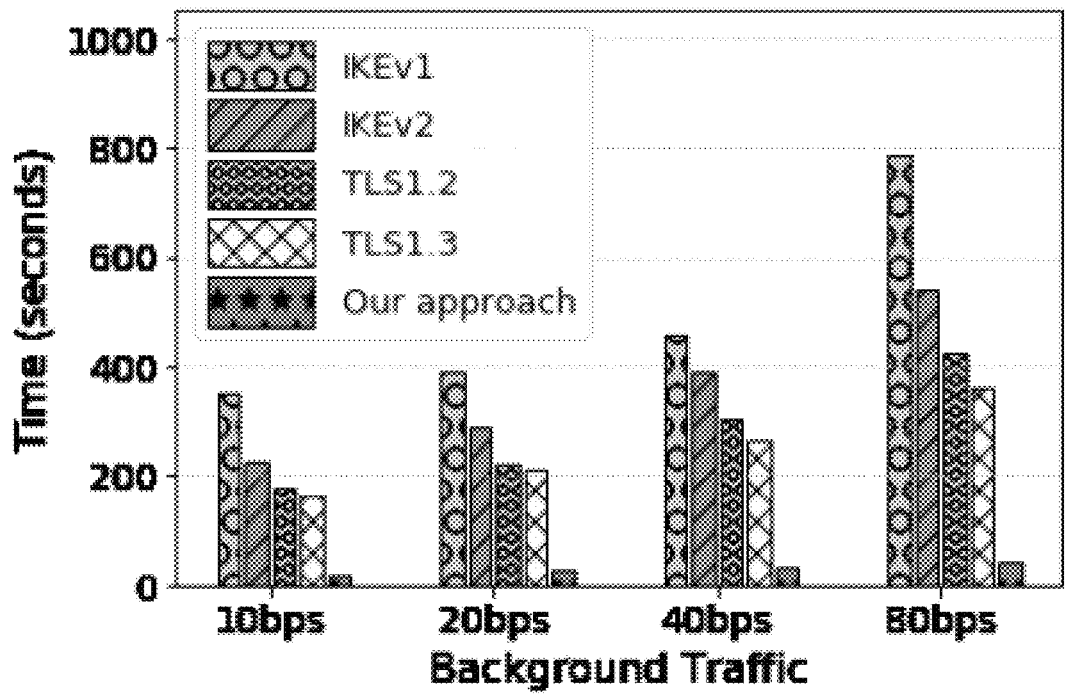
FIG. 9 shows a bar chart of rural PKI settings. The vertical axis is time (in s), and the horizontal axis shows background traffic of 10 bps, 20 bps, 40 bps, and 80 bps. In each grouping of bars, the leftmost bar is for IKEv1, the second-to-the-leftmost bar is for IKEv2, the middle bar is for TLS 1.2, the second-to-the-rightmost bar is for TLS 1.3, and the rightmost bar is for a system/method according to an embodiment of the subject invention (labeled "our approach" in FIG. 9).
Figure 10:
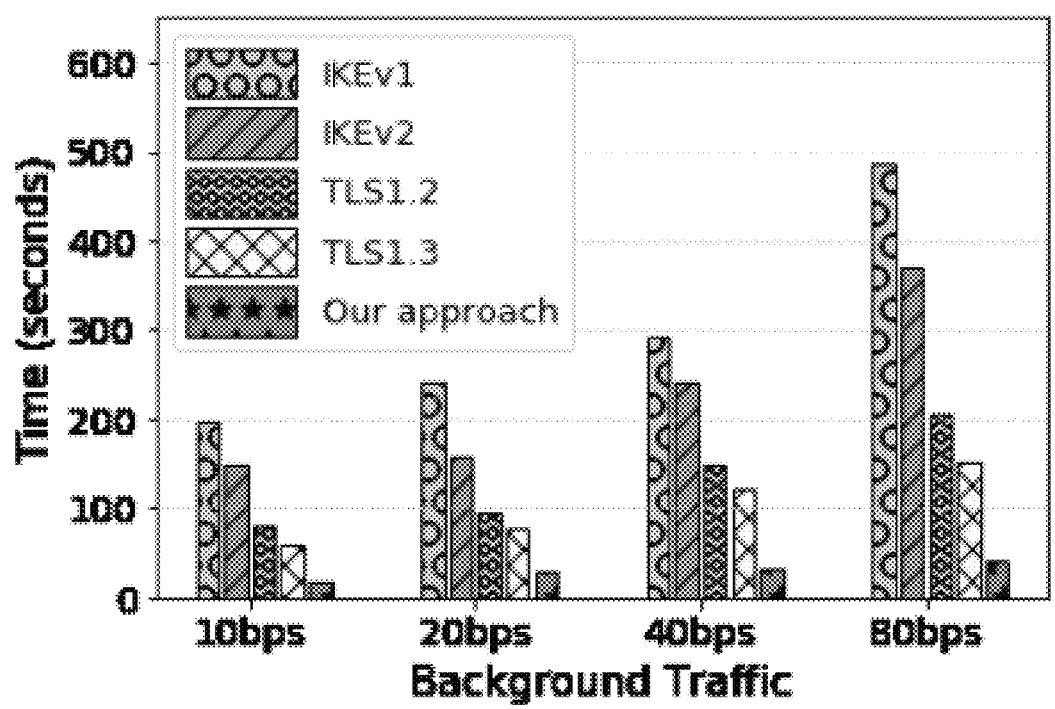
FIG. 10 shows a bar chart of rural PSK settings. The vertical axis is time (in s), and the horizontal axis shows background traffic of 10 bps, 20 bps, 40 bps, and 80 bps. In each grouping of bars, the leftmost bar is for IKEv1, the second-to-the-leftmost bar is for IKEv2, the middle bar is for TLS 1.2, the second-to-the-rightmost bar is for TLS 1.3, and the rightmost bar is for a system/method according to an embodiment of the subject invention (labeled "our approach" in FIG. 10).

FIG. 9 shows the results for rural PKI settings. The data submission latency was even worse in rural settings. Even with TLS 1.3, the data submission takes more than 6 minutes. This is due to reduced bandwidth with increased distances. It is also interesting to observe that the performance gap between TLS 1.3 and TLS 1.2 in rural environments widens significantly because additional 1-RTT packet overhead in TLS 1.2 causes significant latency in a severely low-bandwidth communication environment. Moreover, even though an ECC PKI setup that has a decent public key and signature size compared to RSA PKI was used, the required certificate and signature exchange for mutual authentication affects the latency adversely. FIG. 10 shows the results for rural PSK settings.

For both rural PKI and rural PSK, the system/method of embodiments of the subject invention significantly reduced the elapsed time. For instance, it takes nearly 3 minutes to transport the payload to the CC even using TLS 1.3. However, the system/method of embodiments of the subject invention only requires half a minute to transmit the same payload. Overall, the rural environment stresses the importance of the system/method of embodiments of the subject invention in a much better way as it significantly outperforms TLS and IKE.

It should be understood that the examples and embodiments described herein are for illustrative purposes only and that various modifications or changes in light thereof will be suggested to persons skilled in the art and are to be included within the spirit and purview of this application.

All patents, patent applications, provisional applications, and publications referred to or cited herein (including those in the "References" section, if present) are incorporated by reference in their entirety, including all figures and tables, to the extent they are not inconsistent with the explicit teachings of this specification.

What is claimed is:
1. A system for authentication and key agreement in a smart grid, the system comprising:
a control center; and
a plurality of field devices,
each field device of the plurality of field devices being configured such that, when it first joins the smart grid, it performs a setup by sending to the control center a Diffie-Hellman (DH) request message that includes the identification of the field device sending the DH request message,
the control center being configured such that, upon receiving the DH request message, the control center generates a secret key, $S_i=H(ID_i\|Nonce)$, for the field device that sent the DH request message, computes $H''(S_i)=S''$ where n is a predefined parameter and $H''$ $(S_i)$ is obtained by taking a cryptographic hash of $S_i$: $H(H(H, \ldots, H(S_i))$, and sends a DH configuration to the field device that sent the DH request message, the DH configuration comprising a shared DH component, an update time, and the current secret key, i representing the field device that sent the DH request message, H( ) being a one-way secure hash function, ID being a device identification, and Nonce being a unique identifier,
each field device of the plurality of field devices being further configured such that when it sends data to the control center after performing the setup, the field device first computes a shared key and uses the shared key to encrypt and authenticate the data to be sent to the control center, and sends the current secret key to the control center along with the encrypted data,
the control center being further configured such that, upon receiving a current secret key and data from a field device of the plurality of field devices, the control center ensures the validity of the field device by checking whether the current secret key is correct, and then sends an updated secret key to the field device, which is configured to compute the hash of the updated secret key and check whether it is equal to the current secret key to ensure the validity of the control center and to update the current secret key to the updated secret key if the control center is determined to be valid,
each field device of the plurality of field devices being further configured to refresh the shared key by using a first random number, computing a fresh ephemeral DH share, and generating a refreshed secret key, the control center being further configured to refresh the shared key by using a second random number and computing the refreshed secret key based on the second random number and the fresh ephemeral DH share, and each field device of the plurality of field devices being an intelligent electronic device (IED), a sensor, a remote terminal unit (RTU), a distributed energy resource (DER), or a dispersed load.

2. The system according to claim 1, the shared DH component being computed based on $g^c$, where g is a DH parameter and c is the second random number picked by the control center.

3. The system according to claim 1, the current secret key being utilized for a period of time no longer than the update time.

4. The system according to claim 1, the fresh ephemeral DH share being computed based on $g^b$, where g is a DH parameter and b is the first random number.

5. The system according to claim 1, the control center and the plurality of field devices communicating with each other wirelessly.

6. The system according to claim 1, the control center and the plurality of field devices communicating with each other via at least one of a radio tower and the internet.

7. The system according to claim 1, the control center generating a different secret key for each field device of the plurality of field devices.

8. The system according to claim 1, the control center being a supervisory control and data acquisition (SCADA) control center.

9. The system according to claim 1, the control center and the plurality of field devices communicating with each other wirelessly utilizing a bandwidth on the order of kilobits.

10. A method for authentication and key agreement in a smart grid that comprises a control center and a plurality of field devices, the method comprising:

performing, by each field device of the plurality of field devices when it first joins the smart grid, a setup by sending to the control center a Diffie-Hellman (DH) request message that includes the identification of the field device sending the DH request message;

generating, by the control center upon receiving the DH request message, a secret key, $S_i=H(ID_i\|Nonce)$, for the field device that sent the DH request message, followed by computing $H^n(S_i)=S^n$ where n is a predefined parameter and $H^n(S_i)$ is obtained by taking a cryptographic hash of $S_i$: $H(H(H, \ldots, H(S_i))$, and sending a DH configuration to the field device that sent the DH request message, the DH configuration comprising a shared DH component, an update time, and the current secret key, i representing the field device that sent the DH request message, H( ) being a one-way secure hash function, ID being a device identification, and Nonce being a unique identifier;

computing, by each field device of the plurality of field devices when sending data to the control center after performing the setup, a shared key, followed by using the shared key to encrypt and authenticate the data to be sent to the control center, and sending the current secret key to the control center along with the encrypted data;

ensuring, by the control center upon receiving a current secret key and data from a field device of the plurality of field devices, the validity of the field device by checking whether the current secret key is correct, and then sending an updated secret key to the field device;

computing, by each field device of the plurality of field devices when receiving an updated secret key from the control center, the hash of the updated secret key and checking whether it is equal to the current secret key to ensure the validity of the control center and to update the current secret key to the updated secret key if the control center is determined to be valid;

refreshing, by each field device of the plurality of field devices, the shared key by using a first random number, computing a fresh ephemeral DH share, and generating a refreshed secret key; and refreshing, by the control center, the shared key by using a second random number and computing the refreshed secret key based on the second random number and the fresh ephemeral DH share, each field device of the plurality of field devices being an intelligent electronic device (IED), a sensor, a remote terminal unit (RTU), a distributed energy resource (DER), or a dispersed load.

11. The method according to claim 10, the shared DH component being computed based on $g^c$, where g is a DH parameter and c is the second random number picked by the control center.

12. The method according to claim 10, the current secret key being utilized for a period of time no longer than the update time.

13. The method according to claim 10, the fresh ephemeral DH share being computed based on $g^b$, where g is a DH parameter and b is the first random number.

14. The method according to claim 10, the control center and the plurality of field devices communicating with each other wirelessly utilizing a bandwidth on the order of kilobits.

15. The method according to claim 10, the control center and the plurality of field devices communicating with each other via at least one of a radio tower and the internet.

16. The method according to claim 10, the control center generating a different secret key for each field device of the plurality of field devices.

17. The method according to claim 10, the control center being a supervisory control and data acquisition (SCADA) control center.

18. A system for authentication and key agreement in a smart grid, the system comprising:

a control center; and a plurality of field devices, each field device of the plurality of field devices being configured such that, when it first joins the smart grid, it performs a setup by sending to the control center a Diffie-Hellman (DH) request message that includes the identification of the field device sending the DH request message, the control center being configured such that, upon receiving the DH request message, the control center generates a secret key, $S_i=H(ID_i\|Nonce)$, for the field device that sent the DH request message, computes $H^n(S_i)=S^n$ where n is a predefined parameter and $H^n(S_i)$ is obtained by taking a cryptographic hash of $S_i$: $H(H(H, \ldots, H(S_i))$, and sends a DH configuration to the field device that sent the DH request message, the DH configuration comprising a shared DH component, an update time, and the current secret key, i representing the field device that sent the DH request message, H( ) being a one-way secure hash function, ID being a device identification, and Nonce being a unique identifier, each field device of the plurality of field devices being further configured such that when it sends data to the control center after performing the setup, the field device first computes a shared key and uses the shared key to encrypt and authenticate the data to be sent to the control center, and sends the current secret key to the control center along with the encrypted data, the control center being further configured such that, upon receiving a current secret key and data from a field device of the plurality of field devices, the control center ensures the validity of the field device by checking whether the current secret key is correct, and then sends an updated secret key to the field device, which is configured to compute the hash of the updated secret key and check whether it is equal to the current secret key to ensure the validity of the control center and to update the current secret key to the updated secret key if the control center is determined to be valid, each field device of the plurality of field devices being further configured to refresh the shared key by using a first random number, computing a fresh ephemeral DH share, and generating a refreshed secret key, the control center being further configured to refresh the shared key by using a second random number and computing the refreshed secret key based on the second random number and the fresh ephemeral DH share, the shared DH component being computed based on $g^c$, where g is a DH parameter and c is the second random number picked by the control center, the current secret key being utilized for a period of time no longer than the update time, each field device of the plurality of field devices being an intelligent electronic device (IED), a sensor, a remote terminal unit (RTU), a distributed energy resource (DER), or a dispersed load, the fresh ephemeral DH share being computed based on $g^b$, where b is the first random number, the control center and the plurality of field devices communicating with each other wirelessly utilizing a bandwidth on the order of kilobits, the control center generating a different secret key for each field device of the plurality of field devices, and the control center being a supervisory control and data acquisition (SCADA) control center.

* * * * *